US009826682B2

(12) United States Patent
Blank et al.

(10) Patent No.: US 9,826,682 B2
(45) Date of Patent: Nov. 28, 2017

(54) OPERATING STATE DETECTION SYSTEM FOR WORK MACHINE WITH FUSION CONSIDERING SENSOR VALUE RELIABILITY

(71) Applicant: Deere & Company, Moline, IL (US)

(72) Inventors: Sebastian Blank, Kaiserslautern (DE); Cameron R Mott, Davenport, IA (US)

(73) Assignee: Deere & Company, Moline, IL (US)

( * ) Notice: Subject to any disclaimer, the term of this patent is extended or adjusted under 35 U.S.C. 154(b) by 525 days.

(21) Appl. No.: 13/920,713

(22) Filed: Jun. 18, 2013

(65) Prior Publication Data

US 2014/0277961 A1    Sep. 18, 2014

Related U.S. Application Data

(63) Continuation-in-part of application No. 13/845,712, filed on Mar. 18, 2013.

(51) Int. Cl.
*A01D 41/127* (2006.01)
*G05B 13/02* (2006.01)

(52) U.S. Cl.
CPC ....... *A01D 41/127* (2013.01); *G05B 13/0275* (2013.01)

(58) Field of Classification Search
None
See application file for complete search history.

(56) References Cited

U.S. PATENT DOCUMENTS

| 6,315,658 | B1* | 11/2001 | Weber ............................. 460/6 |
| 6,726,559 | B2 | 4/2004 | Bischoff |
| 6,863,604 | B2 | 3/2005 | Behnke |
| 8,230,667 | B2 | 7/2012 | Finkler et al. |
| 2006/0190163 | A1* | 8/2006 | Anderson ..................... 701/201 |
| 2006/0276949 | A1* | 12/2006 | Beck et al. ..................... 701/50 |
| 2009/0037059 | A1* | 2/2009 | Huster et al. .................. 701/50 |
| 2010/0217481 | A1* | 8/2010 | Baumgarten et al. .......... 701/35 |

\* cited by examiner

*Primary Examiner* — Rami Khatib
*Assistant Examiner* — Gerrad A Foster
(74) *Attorney, Agent, or Firm* — Rathe Lindenbaum LLP

(57) ABSTRACT

A system for detecting an operating state of a work machine (100), comprises at least two sensors (160, 162, 164, 166, 168, 170, 178b, 178c, 178e, 178f, 178g, 172a, 172b, 174, 178a, 178d) for sensing parameters affecting an operation state of the machine (100) and an operating state evaluation circuit (228) having an output for an operating state signal value (232). The operating state evaluation circuit (228 determines the operating state signal value (232) based upon fused signals from the sensors and a sensor reliability signal from a weighing function evaluator (240).

20 Claims, 2 Drawing Sheets

OPERATING STATE DETECTION SYSTEM FOR WORK MACHINE WITH FUSION CONSIDERING SENSOR VALUE RELIABILITY

RELATED APPLICATIONS

This application is a continuation-in-part of (and claims priority to) U.S. patent application Ser. No. 13/845,712, which was filed Mar. 18, 2013.

FIELD OF THE INVENTION

The present invention relates generally to work machines, like agricultural and construction machines and more particular to a system for automatically detecting the operating state of the machine based on sensor input.

BACKGROUND OF THE INVENTION

In a number of applications, it can be important to know an operating state of a work machine. The operating state can be used for automatically controlling components of the work machine. For example, in a construction machine or agricultural harvesting machine, an engine speed can be automatically set to idle when the operation state is detected as being "inactive" for a predetermined time (U.S. Pat. No. 8,230,667 B2). Another example is a combine with an automatic controller that needs to know whether the crop flow has become stable after an operating parameter of the combine has been altered or a combine with a number of vibration sensors that needs to know whether the combine is in an operating state in which it is appropriate to record vibration signals for subsequent fault detection of operating parts (US 2006/0276949 A1). The detected state can also be recorded for documentation and/or accounting purposes.

The system according to the mentioned prior art documents fuses values from a number of sensors to determine the operating state of the machine that may vary over the time. However, for numerous reasons signals from one such sensor can be less reliable than those from another sensor, be it due to the type of sensor or due to the operating state. For example, grain loss sensors are less reliable in high throughput conditions or in wet grain than in low throughput conditions or in dry grain. Since this is not considered in the prior art operating state detection system, its output is not always reliable.

SUMMARY OF THE INVENTION

It is therefore an object of the present invention to provide an improved operating state detection system for a work machine. It is another object to provide such a system, which overcomes most, or all of the aforementioned problems.

A system for detecting an operating state of a work machine comprises at least two sensors for sensing parameters affecting an operation state of the machine and an operating state evaluation circuit having an output for an operating state signal value indicating an operating state of the machine. The operating state evaluation circuit determines the operating state signal value based upon fused signals from the sensors. A weighing function evaluator receives the signals from the sensors and derives a reliability signal indicating a reliability of the signal of at least one (or more) of the sensors. The operating state evaluation circuit receives the reliability signal from the weighing function evaluator and considers the signals from the sensors based on their respective reliability signal from the weighing function evaluator when evaluating the operating state of the machine. The reliability signal can be binary or selected from an arbitrary number of values larger than 2, i.e. be quasi-analogue.

In other words, the reliability or exactness of the respective sensor signals is considered during their fusion. This leads to a more reliable operating state signal.

The operating state evaluation circuit can calculate the reliability of the sensor signal based upon the signal from the particular sensor and/or a comparison of the signal from the particular sensor with a signal from at least one different sensor. This means that the reliability of the signal of the sensor is evaluated based upon the sensor signal, such that improbable sensor value can be excluded. Alternatively or additionally, a first sensor can evaluate the operating conditions of a second sensor, which affect the reliability of the second sensor. For example, the grain throughput and/or moisture in a combine can be sensed by a first sensor. The output of the first sensor indicates the reliability of the signals of the second sensor, which may be a loss sensor with an impact plate. In particular, the operating state evaluation circuit can calculate the reliability of the signal from the sensor based upon at least one of range, change rate, noise level of the signal from the sensor and an environmental condition of the sensor, like field topology, crop type, crop density and crop moisture.

The operating state signal value can in particular indicate whether the machine is in a steady operating state or not. In another embodiment, the operating state value can indicate whether the machine is idle, performing a particular type of work or in a road transport mode.

The operating state evaluation circuit can additionally provide a confidence signal output indicating an estimated accurateness of the operating state signal value and/or a time signal indicating a time interval for reaching the operating state after a crop processing parameter in the machine was altered.

The operating state evaluation circuit is preferably further responsive to a trigger function input that indicates a minimum level of confidence that the operating state evaluation circuit must determine before the operating state evaluation circuit will command the operating state signal value to indicate that the operating state has been reached.

The described operating state detecting system can be preferably used in a harvesting machine.

The sensors therein preferably comprise a crop sensor for sensing a crop parameter and a processing result sensor for sensing a processing result parameter of a result of crop processing in the harvesting machine. The operating state detection system for this harvesting machine preferably comprises a fuzzy logic circuit configured to receive a signal indicating the crop parameter, a signal indicating the processing result parameter and signals indicating time derivatives of the crop parameter and the processing result parameter as input signals. The fuzzy logic circuit further comprises a parameter range classifier circuit for each input signal. The parameter range classifier circuit provides a respective continuous output indicating a probability that the machine has reached a steady state of crop processing, while the operating state evaluation circuit is configured to receive the parameter range classifier circuit outputs and to generate the operating state signal value based upon the parameter range classifier circuit outputs and the reliability signal.

The harvesting machine can comprise a controller circuit. The operating state signal value is configured to be communicated to the controller circuit for one of automatic control of an actuator for adjusting a crop processing parameter of the harvester and of controlling an operator interface device for indicating an adjustment value for the actuator to a machine operator. The controller circuit is configured to (i) receive the signal indicating the crop parameter, (ii) receive the signal indicating the processing result parameter and (iii) evaluate the adjustment value based upon the signal indicating the crop parameter and the signal indicating the processing result parameter after the operating state signal value indicates that the harvester has reached a steady state of crop processing.

In accordance with one aspect of the invention, a system for detecting an operating state of a work machine is provided, comprising: at least two sensors configured to sense parameters affecting an operation state of the work machine; an operating state evaluation circuit configured to generate an operating state signal value, wherein the operating state signal value indicates an operating state of the work machine, and wherein the operating state evaluation circuit is configured to generate the operating state signal value based upon first signals from the at least two sensors; and a weighing function evaluator configured to receive second signals from the at least two sensors and configured to generate a reliability signal indicating a reliability of at least one of the first signals; wherein the operating state evaluation circuit is operable to receive the reliability signal and, during evaluating the operating state of the work machine, to weight the first signals based on the reliability signal.

The weighing function evaluator may be configured to calculate the reliability signal based upon at least one of the first signals and based upon a comparison of the at least one of the first signals with a signal from at least one sensor.

The weighing function evaluator may be configured to generate the reliability signal based upon at least one of (i) a range of the at least one of the first signals, (ii) a change rate of the at least one of the first signals, (iii) a noise level of the at least one of the first signals and (iv) an environmental condition, wherein the environmental condition comprises at least one of a field topology, a crop type, a crop density and a crop moisture.

The operating state signal value may indicate whether the work machine is in a steady operating state or not.

The operating state evaluation circuit may further generate a confidence signal, wherein the confidence signal indicates an estimated accurateness of the operating state signal value.

The operating state evaluation circuit may further provide a time signal wherein the time signal indicates a time interval for reaching the operating state after a crop processing parameter in the work machine was altered.

The operating state evaluation circuit may be responsive to a trigger function input and further wherein the trigger function input indicates a minimum level of confidence that the operating state evaluation circuit must determine before the operating state evaluation circuit will command the operating state signal value to indicate that the operating state has been reached.

In accordance with a second aspect of the invention a harvesting machine is provided having an operating state, wherein the harvesting machine wherein the harvesting machine comprises: a main frame; a threshing and separating assembly supported on the main frame; a feederhouse supported on the main frame; a header supported on the feederhouse; and a system for detecting the operating state of the harvesting machine, the system comprising: at least two sensors configured to sense parameters affecting an operation state of the harvesting machine; an operating state evaluation circuit configured to generate an operating state signal value, wherein the operating state signal value indicates an operating state of the harvesting machine, and wherein the operating state evaluation circuit is configured to generate the operating state signal value based upon first signals from the at least two sensors; and a weighing function evaluator configured to receive second signals from the at least two sensors and configured to generate a reliability signal indicating a reliability of at least one of the first signals; wherein the operating state evaluation circuit is operable to receive the reliability signal and, during evaluating the operating state of the harvesting machine, to weight the first signals based on the reliability signal.

The at least two sensors may comprise a crop sensor configured to sense a crop parameter, and a processing result sensor configured to sense a processing result parameter of a result of crop processing in the harvesting machine.

The system may further comprise a fuzzy logic circuit configured to receive input signals, the input signals comprising (i) a signal from the crop sensor indicating the crop parameter, (ii) a signal from the processing result sensor indicating the processing result parameter, (iii) a signal indicating a time derivative of the crop parameter, and (iv) a signal indicating a time derivative of the processing result parameter; wherein the fuzzy logic circuit further comprises a parameter range classifier circuit associated with each input signal of the input signals, wherein each parameter range classifier circuit is configured to provide a continuous output indicating a probability that the machine has reached a steady state of crop processing, and wherein the operating state evaluation circuit is configured to receive the continuous output of each parameter range classifier circuit and is configured to generate the operating state signal value based upon the continuous output of each parameter range classifier circuit.

The harvesting machine may further comprise a controller circuit, wherein the operating state signal value is configured to be communicated to the controller circuit for at least one of (i) automatic control of an actuator for adjusting a crop processing parameter of the harvesting machine, and (ii) automatic control of an operator interface device to indicate an adjustment value for the actuator to a machine operator, and further wherein the controller circuit is configured to (i) receive the signal indicating the crop parameter, (ii) receive the signal indicating the processing result parameter and (iii) evaluate the adjustment value based upon the signal indicating the crop parameter and the signal indicating the processing result parameter after the operating state signal value indicates that the harvesting machine has reached a steady state of crop processing.

These and other objects, features and advantages of the invention will become apparent to one skilled in the art upon reading the following description in view of the drawings.

DESCRIPTION OF THE PREFERRED EMBODIMENT

Figure 1:
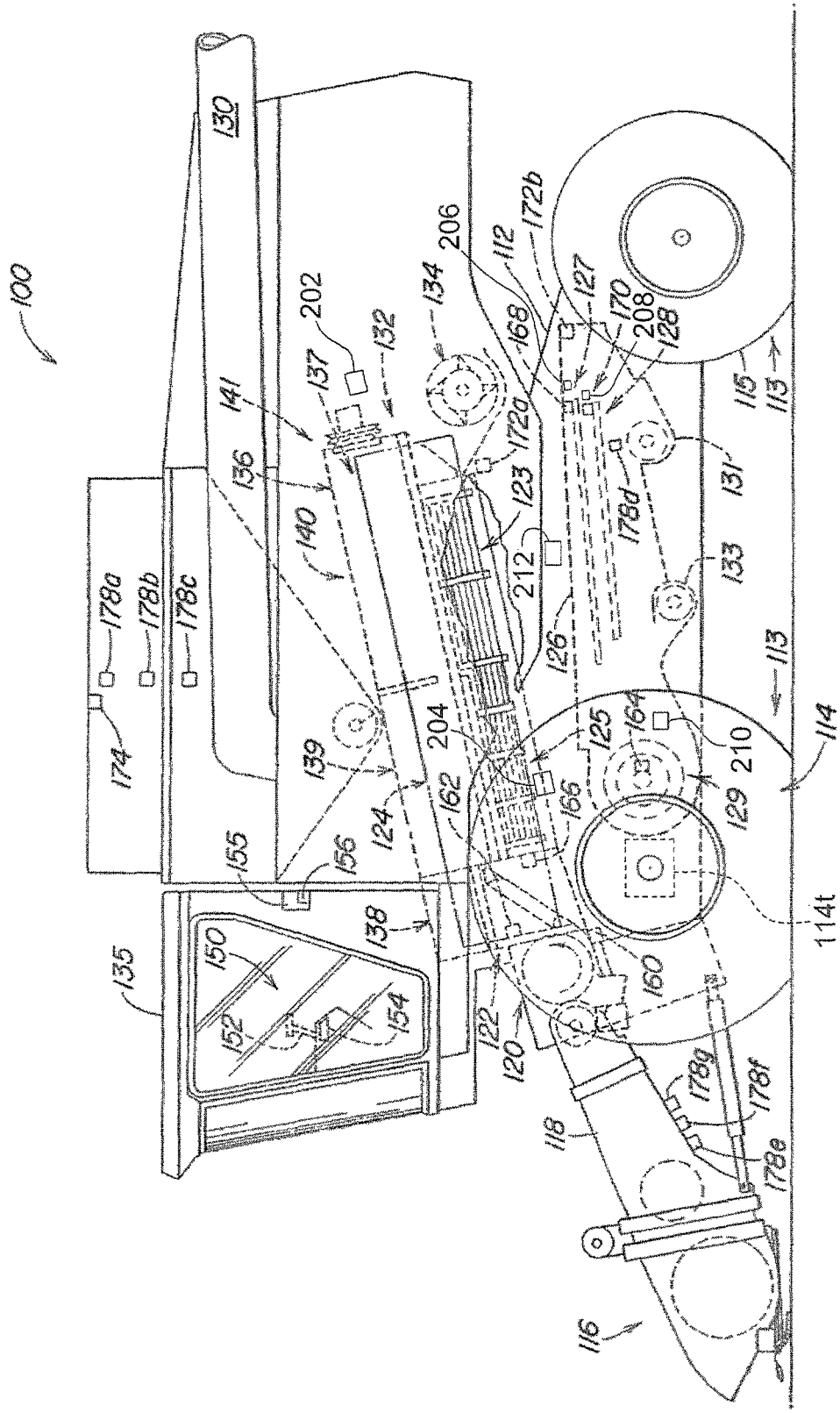
FIG. 1 is a side view of a harvester utilizing the control system of the present invention.

Referring now to FIG. 1, a work machine, here embodied as an agricultural harvester 100 in the form of a combine is shown, the harvester 100 comprising a main frame 112 having wheel structures 113, the wheel structures 113 comprising front wheels 114 and rear wheels 115 supporting the main frame 112 for forward movement over a field of crop to be harvested. The front wheels 114 are driven by an electronically controlled hydrostatic transmission and the rear wheels 115 are steered.

A vertically adjustable header 116, shown here as a harvesting platform, is used for harvesting a crop and directing it to a feederhouse 118. The feederhouse 118 is pivotally and adjustably connected to the main frame 112 and includes a conveyor for conveying the harvested crop to a beater 120. The beater 120 directs the crop upwardly through an inlet transition section 122 to a rotary threshing and separating assembly 124. Other orientations and types of threshing structures and other types of headers 116, such as header that comprises a generally transverse frame, the frame further supporting individual row units spaced apart across the width of the frame, could also be used. As another alternative, a draper platform could be used in which a transverse frame supports endless belt conveyors carry crop from the sides of the header toward a central region, and a conveyor in the central region conveys the crop rearward through an central aperture.

The rotary threshing and separating assembly 124 threshes and separates the harvested crop material. Grain and chaff fall through a concave 125 and separation grates 123 on the bottom of the separating assembly 124 to a cleaning system 126, and are cleaned by a chaffer 127 and a sieve 128 and air fan 129. The cleaning system 126 removes the chaff and directs the clean grain to a clean grain tank by a grain auger 133. The clean grain in the tank can be unloaded into a grain cart or truck by unloading auger 130. Tailings fall into the returns auger 131 and are conveyed to the rotary threshing and separating assembly 124 (or to a separate re-thresher, not shown) where they are threshed a second time.

Threshed and separated straw is discharged from the rotary threshing and separating assembly 124 through an outlet 132 to a discharge beater 134. The discharge beater 134 in turn propels the straw out the rear of the harvester 100. It should be noted that the discharge beater 134 could also discharge the straw directly to a straw chopper. The operation of the harvester 100 is controlled from an operator's cab 135.

The rotary threshing and separating assembly 124 comprises a housing 136 for a cylindrical rotor and a rotor 137 located inside the housing 136. The front part of the rotor and the rotor housing define the infeed section 138. Downstream from the infeed section 138 are a threshing section 139, a separating section 140 and a discharge section 141. The rotor 137 in the infeed section 138 is provided with a conical rotor drum having helical infeed elements for engaging harvested crop material received from the beater 120 and inlet transition section 122. Immediately downstream from the infeed section 138 is the threshing section 139.

In the threshing section 139 the rotor 137 comprises a cylindrical rotor drum having a number of threshing elements for threshing the harvested crop material received from the infeed section 138. Downstream from the threshing section 139 is the separating section 140 wherein the grain trapped in the threshed crop material is released and falls to the cleaning system 126. The separating section 140 merges into a discharge section 141 where crop material other than grain is expelled from the rotary threshing and separating assembly 124.

An operator's console 150 located in the operator's cab 135 includes conventional operator controls including a hydro shift lever 152 for manually controlling the speed range and output speed of the hydrostatic transmission for driving the front wheels 114. An operator interface device 154 in the operator's cab 135 allows entry of information into a control arrangement 155 comprising an on-board processor system 156, which provides automatic speed control and numerous other control functions described below for the harvester 100. The operator can enter various types of information into the operator interface device 154, including crop type, location, yield and the like.

Signals from the sensors include information on environmental variables such as relative air humidity, and information on variables controlled by the on-board control system. Signals include vehicle speed signals from a radar sensor or other conventional ground speed sensor 160, rotor speed signals from a rotor speed sensor 162, a fan speed signal from the fan speed sensor 164, a concave clearance signal from a concave clearance sensor 166, a chaffer opening signal from a chaffer opening sensor 168 and sieve opening signal from a sieve opening sensor 170, respectively. Additional signals originate from a grain-loss sensor 172a at the exit of the rotary threshing and separating assembly 124, grain-loss sensors 172b at either side of the exit of the cleaning system 126, a grain-damage sensor 174 and various other sensor devices on the harvester. Signals from a tank cleanliness sensor 178a, a mass flow sensor 178b, a grain moisture sensor 178c, a tailings volume sensor 178d, a relative humidity sensor 178e, a temperature sensor 178f and a material moisture sensor 178g are also provided.

The relative humidity sensor 178e, the temperature sensor 178f and the material moisture sensor 178g indicate conditions of the cut crop material prior to its being processed (i.e. threshed, cleaned, or separated) in the harvester 100.

A communications circuit directs signals from the mentioned sensors and an engine speed monitor, a grain mass flow monitor, and other microcontrollers on the harvester to the control arrangement 155. Signals from the operator interface device 154 are also directed to the control arrangement 155. The control arrangement 155 is connected to actuators 202, 204, 206, 208, 210, 212 for controlling adjustable elements on the harvester 100.

The actuators controlled by the control arrangement 155 comprise a rotor speed actuator 202 configured to control the rotational speed of the rotor 137, a concave clearance actuator 204 configured to control the clearance of the concave 125, a chaffer opening actuator 206 configured to control the opening width of the chaffer 127, a sieve opening actuator 208 configured to control the opening of the sieve 128, a fan speed actuator 210 configured to control the speed of the air fan 129, and a ground speed actuator 212 configured to control the output speed of the hydrostatic transmission 114t and thus the ground speed of the harvester 100. These actuators are known in the art and thus are schematically shown in FIG. 1.

Figure 2:
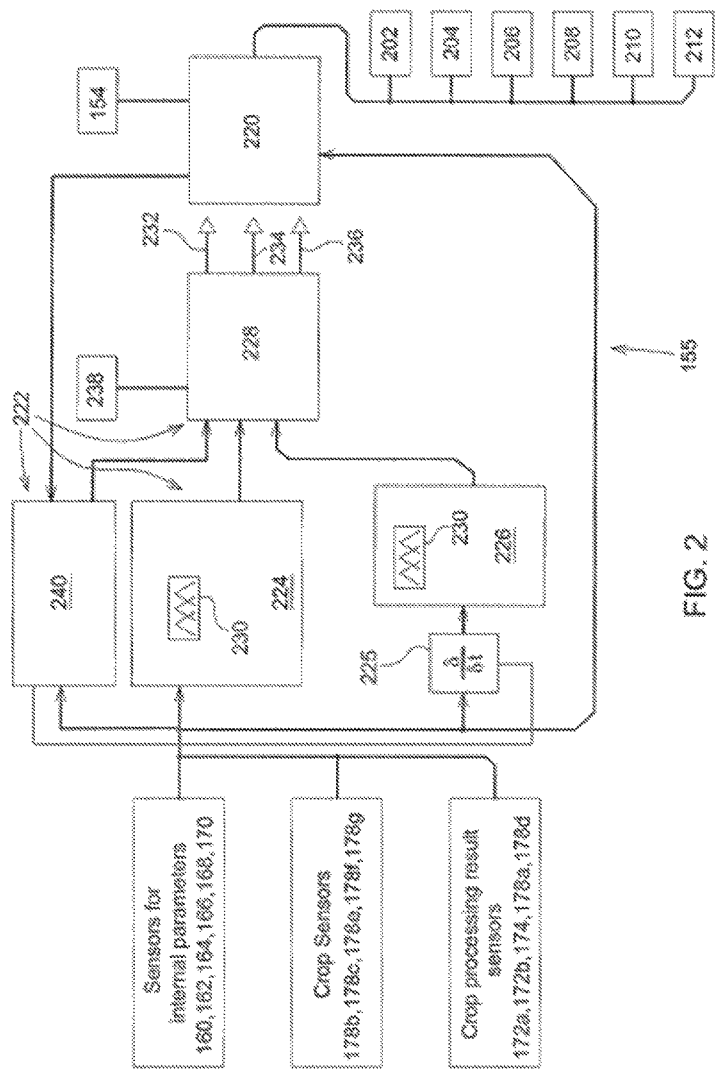
FIG. 2 is a schematic diagram of a control system of the harvester shown in FIG. 1.

Reference is now made to FIG. 2. The control arrangement 155 comprises a controller circuit 220 that receives signals from the ground speed sensor 160, the rotor speed sensor 162, the fan speed sensor 164, the concave clearance sensor 166, the chaffer opening sensor 168, and the sieve opening sensor 170 (which represent internal parameters of the harvesting machine), crop sensors (which include the mass flow sensor 178b, the moisture sensor 178c, the relative humidity sensor 178e, the temperature sensor 178f, the material moisture sensor 178g and crop processing result sensors (which include grain-loss sensor 172a, the grain-loss sensor 172*b*, grain-damage sensor 174, tank cleanliness sensor 178*a*, and tailings volume sensor 178*d*).

The controller circuit 220 comprises one or more electronic control units (ECUs) each of which further comprise a digital microprocessor coupled to a digital memory circuit. The digital memory circuit contains instructions that configure the ECU to perform the functions described herein.

There may be a single ECU that provides all the functions of the controller circuit 220 described herein. Alternatively there may be two or more ECU's connected to each other using one or more communications circuits. Each of these communications circuits may comprise one or more of a data bus, CAN bus, LAN, WAN or other communications arrangement.

In an arrangement of two or more ECUs, each of the functions described herein may be allocated to an individual ECU of the arrangement. These individual ECU's are configured to communicate the results of their allocated functions to other ECUs of the arrangement.

The harvester 100 further comprises a system for detecting an operating state of the harvester 100. This system comprises a fuzzy logic circuit 222 that comprises a first parameter range classifier circuit 224, a second parameter range classifier circuit 226 and an operating state evaluation circuit 228.

The fuzzy logic circuit 222 comprises one or more electronic control units (ECUs) each of which further comprise a digital microprocessor coupled to a digital memory circuit. The digital memory circuit contains instructions that configure the ECU to perform the functions described herein.

There may be a single ECU that provides all the functions of the fuzzy logic circuit 222 described herein. Alternatively there may be two or more ECU's connected to each other using one or more communications circuits. Each of these communications circuits may comprise one or more of a data bus, CAN bus, LAN, WAN or other communications arrangement.

In an arrangement of two or more ECUs, each of the functions described herein may be allocated to an individual ECU of the arrangement. These individual ECU's are configured to communicate the results of their allocated functions to other ECUs of the arrangement.

A first parameter range classifier circuit 224 receives signals from the ground speed sensor 160, the rotor speed sensor 162, the fan speed sensor 164, the concave clearance sensor 166, the chaffer opening sensor 168, and the sieve opening sensor 170 for internal parameters, from the crop sensors (which include the mass flow sensor 178*b*, the moisture sensor 178*c*, the relative humidity sensor 178*e*, the temperature sensor 178*f*, and the material moisture sensor 178*g*) and from the crop processing result sensors (which include the grain-loss sensor 172*a*, the grain-loss sensor 172*b*, the grain-damage sensor 174, the tank cleanliness sensor 178*a*, and the tailings volume sensor 178*d*).

The system for detecting the operating state of the harvester 100 further comprises a differentiating circuit 225 which is coupled to each of the sensors 160, 162, 164, 166, 168, 170, 178*b*, 178*c*, 178*e*, 178*f*, 178*g*, 172*a*, 172*b*, 174, 178*a*, 178*d* to receive a corresponding signal therefrom. The differentiating circuit 225 is configured to calculate a time rate of change for each of the signals it receives from sensors 160, 162, 164, 166, 168, 170, 178*b*, 178*c*, 178*e*, 178*f*, 178*g*, 172*a*, 172*b*, 174, 178*a*, 178*d*. The differentiating circuit 225 is further configured to transmit a corresponding continuous signal for each of the sensors indicating the time rate of change for that sensor 160, 162, 164, 166, 168, 170, 178*b*, 178*c*, 178*e*, 178*f*, 178*g*, 172*a*, 172*b*, 174, 178*a*, 178*d*. The differentiating circuit 225 is coupled to the second parameter range classifier circuit 226 to provide the continuous time rate of change signals to the second parameter range classifier circuit 226.

A second parameter range classifier circuit 226 receives the time rate of change signals for each sensor 160, 162, 164, 166, 168, 170, 178*b*, 178*c*, 178*e*, 178*f*, 178*g*, 172*a*, 172*b*, 174, 178*a*, 178*d* from the differentiating circuit 225, which in turn received signals from the ground speed sensor 160, the rotor speed sensor 162, the fan speed sensor 164, the concave clearance sensor 166, the chaffer opening sensor 168, and the sieve opening sensor 170 for internal parameters, from the crop sensors (including mass flow sensor 178*b*, moisture sensor 178*c*, relative humidity sensor 178*e*, temperature sensor 178*f*, material moisture sensor 178*g*) and from the crop processing result sensors (including grain-loss sensor 172*a*, the grain-loss sensor 172*b*, grain-damage sensor 174, tank cleanliness sensor 178*a*, and tailings volume sensor 178*d*).

Each of the first parameter range classifier circuit 224 and the second parameter range classifier circuit 226 comprises several fuzzy classifier circuits 230.

Each of the sensors 160, 162, 164, 166, 168, 170, 172*a*, 172*b*, 174, 178*a*, 178*d*,178*b*, 178*c*, 178*e*, 178*f*, and 178*g* is coupled to a corresponding fuzzy classifier circuit 230 of the first parameter range classifier circuit 224 to transmit its sensor signal thereto.

Each of the sensors 160, 162, 164, 166, 168, 170, 172*a*, 172*b*, 174, 178*a*, 178*d*,178*b*, 178*c*, 178*e*, 178*f*, and 178*g* is coupled to a corresponding fuzzy classifier circuit 230 of the second parameter range classifier circuit 226 (via the differentiating circuit 225) to transmit a time derivative of it sensor signal thereto.

Each of the fuzzy classifier circuits 230 is configured to classify the sensor signal it receives into a number of classes. Each of the fuzzy classifier circuits 230 in the first parameter range classifier circuit 224 evaluates the range (fuzzy class) of its corresponding sensor signal. Each of the fuzzy classifier circuits 230 in the second parameter range classifier circuit 226 evaluates the change rate of its corresponding sensor signal.

All of the fuzzy classifier circuits 230 perform their classifications according to a predetermined specification that is generated in advance based on expert knowledge or another suitable system. The particular parameters and coefficients employed by each fuzzy classifier circuit 230 will depend upon the type of sensor to which the fuzzy classifier circuit 230 is coupled. They will also depend upon the physical construction of the harvester, which determines how fast the various subsystems reach a steady state of operation. They will also depend upon the type of actuators used and how fast they respond to changes commanded by the controller circuit 220.

Changes to the specification during runtime are possible, if needed. The fuzzy classifier circuits 230 each provide a continuous output indicating the probability that a steady state of the crop processing in the harvester 100 has been reached. These outputs, the number of which corresponds to the number of input signals, are transmitted to the operating state evaluation circuit 228.

The operating state evaluation circuit 228 provides an operating state signal value 232 to controller circuit 220. The operating state signal value 232 is based upon an overall evaluation of the outputs of the first parameter range classifier circuit 224 and the second parameter range classifier circuit. The operating state signal value is binary (0 or 1). It represents whether the steady state has been reached, i.e. whether it can be assumed that the crop processing operation (crop process) in the harvester 100 is continuous again after a parameter (like an actuator adjustment or a crop property) has been changed. If the operating state signal value 232 is 1, the state is considered as steady and if the operating state signal value 232 is 0, the state is not yet steady.

The fuzzy classifier circuits 230 perform the fuzzification of their respective sensor signals to provide corresponding fuzzified signals. The operating state evaluation circuit 228 is coupled to the first parameter range classifier circuit 224 and the second parameter range classifier circuit 226 to receive and combine (fuse) these fuzzified signals using an inference engine that applies a rule base, followed by a defuzzification. A suitable fuzzy logic circuit 222 is described, for example, in U.S. Pat. No. 6,315,658 B1 which is incorporated herein by reference for all that it teaches.

The operating state evaluation circuit 228 generates and outputs a confidence signal output 234 indicating an estimated accurateness of the operating state signal value 232 to controller circuit 220. The magnitude of the confidence signal output 234 indicates the probability that the operating state signal value 232 is correct (e.g. accurate).

Additionally, the operating state evaluation circuit 228 provides a time signal 236 indicating the time interval for reaching the steady state after a crop processing parameter in the harvester 100 was altered to controller circuit 220.

The operating state evaluation circuit 228 has a trigger function input 238 for specifying the required level of confidence for the steady state signal to indicate a steady state. The operator provides the trigger function input 238 by manipulation of the operator interface device 154. The trigger function input 238 allows the operator to input via the operator interface device 154 whether according to his opinion a high confidence in the steady state is necessary (as might be the case in difficult crop conditions like moist grain) or not. In the latter case, the adjustment process can be accelerated.

The operating state evaluation circuit 228 further receives a reliability signal indicating a reliability of the signal of at least one of the sensors 160, 162, 164, 166, 168, 170, 178b, 178c, 178e, 178f, 178g, 172a, 172b, 174, 178a, 178d from a weighing function evaluator 240 for prioritizing outputs of fuzzy classifier circuits 230 in an evaluation process performed by the operating state evaluation circuit 228 such that measurements from low accuracy sensors can be outweighed. The weighing function evaluator 240 can thus indicate via the operator interface device 154 that a particular sensor, like the grain-loss sensor 172a, the grain-loss sensor 172b (that require regular calibration) is considered as less accurate and thus its relevance in the evaluation process in the operating state evaluation circuit 228 is reduced.

The weighing function evaluator 240 for prioritizing outputs of fuzzy classifier circuits 230 in the evaluation process of the operating state evaluation circuit 228 uses the signals from the respective sensors, in particular the processing result sensors (which include the grain-loss sensor 172a, the grain-loss sensor 172b, the grain-damage sensor 174, the tank cleanliness sensor 178a, and the tailings volume sensor 178d) and/or the crop sensors (which include the mass flow sensor 178b, the moisture sensor 178c, the relative humidity sensor 178e, the temperature sensor 178f, and the material moisture sensor 178g). The relevance of sensors with low accuracy or reliability is thus automatically reduced based upon the sensor signal and preferably a comparison with signals from other sensors. The weighing function evaluator 240 increases the reliability of the operating state evaluation circuit by automatically adjusting the impact of the individual contributions of the mentioned sensors on the overall result by analyzing the properties of incoming data. Examples include (but are not limited to) ranges, change rates, noise level and environmental conditions that give an indication concerning the assumed input reliability. This could be a simple binary accept/ignore decision or a continuous adjustment of a weighting factor to favor highly reliable information over ones that include some degree of vagueness. This way, less trustworthy or potentially faulty inputs can be weighted appropriately (reduced impact or even ignored) both temporarily and permanently. This results in better performance of the operating state evaluation circuit. This is useful since especially loss sensors tend to have a quite heavily changing performance depending on the conditions they are used in.

The controller circuit 220 thus receives the signals from the weighing function evaluator 240, the ground speed sensor 160, the rotor speed sensor 162, the fan speed sensor 164, the concave clearance sensor 166, the chaffer opening sensor 168, and the sieve opening sensor 170, crop sensors (which include the mass flow sensor 178b, the moisture sensor 178c, the relative humidity sensor 178e, the temperature sensor 178f, and the material moisture sensor 178g) and crop processing result sensors (which include the grain-loss sensor 172a, the grain-loss sensor 172b, the grain-damage sensor 174, the tank cleanliness sensor 178a, and the tailings volume sensor 178d), as mentioned above. The controller circuit 220 uses these signals to generate control signals for the actuators 202, 204, 206, 208, 210, 212 in order to achieve an optimal crop processing result. For details of the operation of the controller circuit 220, reference is made to the prior art described in U.S. Pat. No. 6,726,559 B2 and U.S. Pat. No. 6,863,604 B2, which are incorporated herein by reference for all that they teach. In another possible embodiment, controller circuit 220 can give proposals for actuator adjustment values to the operator via the operator interface device 154, such that the operator can adjust the actuators manually.

The signals from the processing result sensors (which include the grain-loss sensor 172a, the grain-loss sensor 172b, the grain-damage sensor 174, the tank cleanliness sensor 178a, and the tailings volume sensor 178d) are important for obtaining feedback signals to the controller circuit 220 such that the latter can provide optimal actuator adjustment signals for the actuators 202, 204, 206, 208, 210, 212. Once a crop parameter has changed, for example when soil properties on a field change, or the harvester 100 has turned in the headland of a field, or one or more of the actuators 202, 204, 206, 208, 210, 212 have been adjusted by the controller circuit 220, it takes some time until the crop processing operation in the harvester 100 has come to a steady state. Only after the steady state was reached, it makes sense to look into the signals from the processing result sensors (which include the grain-loss sensor 172a, the grain-loss sensor 172b, the grain-damage sensor 174, the tank cleanliness sensor 178a, and the tailings volume sensor 178d), since they are not representative for the crop processing operation before that point time of time.

The system for detecting a steady operating state of the harvester 100 comprising the fuzzy logic circuit 222 serving to detect the steady state. It derives this information from the signals of the weighing function evaluator 240, the ground speed sensor 160, the rotor speed sensor 162, the fan speed sensor 164, the concave clearance sensor 166, the chaffer opening sensor 168, and the sieve opening sensor 170, of the crop sensors (which include the mass flow sensor 178*b*, the moisture sensor 178*c*, the relative humidity sensor 178*e*, the temperature sensor 178*f*, and the material moisture sensor 178*g*) and of the crop processing result sensors (which include the grain-loss sensor 172*a*, the grain-loss sensor 172*b*, the grain-damage sensor 174, the tank cleanliness sensor 178*a*, and the tailings volume sensor 178*d*) and submits the operating state signal value 232 to controller circuit 220. The latter only uses signals from the processing result sensors (which include the grain-loss sensor 172*a*, the grain-loss sensor 172*b*, the grain-damage sensor 174, the tank cleanliness sensor 178*a*, and the tailings volume sensor 178*d*) when the operating state signal value 232 indicates a steady state. The confidence signal output 234 can be considered by the controller circuit 220 for weighing the relevance of the processing result sensors (which include the grain-loss sensor 172*a*, the grain-loss sensor 172*b*, the grain-damage sensor 174, the tank cleanliness sensor 178*a*, and the tailings volume sensor 178*d*), compared with other inputs, like those from the crop sensors (which include the mass flow sensor 178 *b*, the moisture sensor 178*c*, the relative humidity sensor 178*e*, the temperature sensor 178*f*, and the material moisture sensor 178*g*. Additionally, the time signal 236 can be used by the controller circuit 220 for deriving crop properties (like throughput) that are used for evaluating the actuator signals.

As indicated in FIG. 2 by the optional feedback line from the controller circuit 220 to the weighing function evaluator 240, the control arrangement 155 may contain a feedback mechanism that will enable the weighing function evaluator 240 (or the operating state evaluation circuit 228) to learn if a decision was correct or incorrect (given the larger overview of the situation provided by e.g. operator feedback via the operator interface device 154 or automated decision making in the controller circuit 220) and adjust future reliability signals accordingly.

Having described the preferred embodiment, it will become apparent that various modifications can be made without departing from the scope of the invention as defined in the accompanying claims. For example, the trigger function input 238 for specifying the required level of confidence for the steady state signal to indicate a steady state can be provided by the controller circuit 220 based upon actual crop conditions. Although the harvester 100 is shown as a combine, the system described above is also suitable for use with other harvesters as well as other implements having interacting and complex adjustments to accommodate various types of continually changing operating conditions.

The invention claimed is:

1. A system for detecting an operating state of a work machine (100), comprising:
    at least two sensors (160, 162, 164, 166, 168, 170, 178*b*, 178*c*, 178*e*, 178*f*, 178*g*, 172*a*, 172*b*, 174, 178*a*, 178*d*) configured to sense parameters affecting an operation state of the work machine (100);
    an operating state evaluation circuit (228) configured to generate an operating state signal value (232), wherein the operating state signal value (232) indicates an operating state of the work machine (100), and wherein the operating state evaluation circuit (228) is configured to generate the operating state signal value (232) based upon first signals from the at least two sensors (160, 162, 164, 166, 168, 170, 178*b*, 178*c*, 178*e*, 178*f*, 178*g*, 172*a*, 172*b*, 174, 178*a*, 178*d*); and
    a weighing function evaluator (240) configured to receive second signals from the at least two sensors (160, 162, 164, 166, 168, 170, 178*b*, 178*c*, 178*e*, 178*f*, 178*g*, 172*a*, 172*b*, 174, 178*a*, 178*d*) and configured to generate a reliability signal indicating a reliability of at least one of the first signals;
    wherein the operating state evaluation circuit (228) is operable to receive the reliability signal and, during evaluating the operating state of the work machine (100), to weight the first signals based on the reliability signal.

2. The system according to claim 1, wherein the weighing function evaluator (240) is configured to calculate the reliability signal based upon at least one of the first signals and based upon a comparison of the at least one of the first signals with a signal from at least one sensor (160, 162, 164, 166, 168, 170, 178*b*, 178*c*, 178*e*, 178*f*, 178*g*, 172*a*, 172*b*, 174, 178*a*, 178*d*).

3. The system according to claim 2, wherein the weighing function evaluator (240) is configured to generate the reliability signal based upon at least one of (i) a range of the at least one of the first signals, (ii) a change rate of the at least one of the first signals, (iii) a noise level of the at least one of the first signals and (iv) an environmental condition, wherein the environmental condition comprises at least one of a field topology, a crop type, a crop density and a crop moisture.

4. The system according to claim 1, wherein the operating state signal value (232) indicates whether the work machine (100) is in a steady operating state or not.

5. The system according to claim 1, wherein the operating state evaluation circuit (228) further generates a confidence signal (234), wherein the confidence signal (234) indicates an estimated accurateness of the operating state signal value (232).

6. The system according to claim 1, wherein the operating state evaluation circuit (228) further provides a time signal (236) wherein the time signal (236) indicates a time interval for reaching the operating state after a crop processing parameter in the work machine (100) was altered.

7. The system according to claim 1, wherein the operating state evaluation circuit (228) is responsive to a trigger function input (238) and further wherein the trigger function input (238) indicates a minimum level of confidence that the operating state evaluation circuit (228) must determine before the operating state evaluation circuit (228) will command the operating state signal value (232) to indicate that the operating state has been reached.

8. The system of claim 1, wherein the at least two sensors sense different parameters.

9. The system of claim 1, wherein the weighting function evaluator is configured to generate a reliability signal indicating a reliability for each of the first signals and wherein the operating state evaluation circuit generates the operating state signal based upon the reliability signal for each of the first signals from the at least two sensors.

10. The system of claim 1, wherein the at least two sensors comprise:
    a first sensor selected from a first group of sensors consisting of: a mass flow sensor, a moisture sensor, a relative humidity sensor, a temperature sensor and a material moisture sensor; and
    a second sensor selected from a second group of sensors consisting of: a grain loss sensor, a green damage sensor, a tank cleanliness sensor and a tailings volume sensor.

11. The system of claim 1, wherein the weighting function evaluator is configured to generate the reliability signal based upon a range of the at least one of the first signals.

12. The system of claim 1, wherein the weighting function evaluator is configured to generate the reliability signal based upon a time rate of change of the at least one of the first signals.

13. The system of claim 1, wherein the weighting function evaluator is configured to generate the reliability signal based upon a noise level of the least one of the first signals.

14. The system of claim 1, wherein the weighing function evaluator is configured to generate the reliability signal based upon at least one environmental condition, the at least one environmental condition selected from a group of environmental conditions consisting of: a field topology, a crop type, a crop density and a crop moisture.

15. A harvesting machine (100) having an operating state, the harvesting machine (100) comprising:
a main frame (112);
a threshing and separating assembly (124) supported on the main frame (112);
a feederhouse (118) supported on the main frame (112);
a header (116) supported on the feederhouse (118); and
a system for detecting the operating state of the harvesting machine (100), comprising:
at least two sensors (160, 162, 164, 166, 168, 170, 178b, 178c, 178e, 178f, 178g, 172a, 172b, 174, 178a, 178d) configured to sense parameters affecting an operation state of the harvesting machine (100);
an operating state evaluation circuit (228) configured to generate an operating state signal value (232), wherein the operating state signal value (232) indicates an operating state of the harvesting machine (100), and wherein the operating state evaluation circuit (228) is configured to generate the operating state signal value (232) based upon first signals from the at least two sensors (160, 162, 164, 166, 168, 170, 178b, 178c, 178e, 178f, 178g, 172a, 172b, 174, 178a, 178d); and
a weighing function evaluator (240) configured to receive second signals from the at least two sensors (160, 162, 164, 166, 168, 170, 178b, 178c, 178e, 178f, 178g, 172a, 172b, 174, 178a, 178d) and configured to generate a reliability signal indicating a reliability of at least one of the first signals;
wherein the operating state evaluation circuit (228) is operable to receive the reliability signal and, during evaluating the operating state of the harvesting machine (100), to weight the first signals based on the reliability signal.

16. The harvesting machine (100) according to claim 15, wherein the at least two sensors (160, 162, 164, 166, 168, 170, 178b, 178c, 178e, 178f, 178g, 172a, 172b, 174, 178a, 178d) comprise a crop sensor (178b, 178c, 178e, 178f, 178g) configured to sense a crop parameter, and a processing result sensor (172a, 172b, 174, 178a, 178d) configured to sense a processing result parameter of a result of crop processing in the harvesting machine (100).

17. The harvesting machine (100) according to claim 16, wherein the system further comprises a fuzzy logic circuit (222) configured to receive input signals, the input signals comprising (i) a signal from the crop sensor indicating the crop parameter, (ii) a signal from the processing result sensor indicating the processing result parameter, (iii) a signal indicating a time derivative of the crop parameter, and (iv) a signal indicating a time derivative of the processing result parameter;
wherein the fuzzy logic circuit (222) further comprises a parameter range classifier circuit (224, 226) associated with each input signal of the input signals, wherein each parameter range classifier circuit (224, 226) is configured to provide a continuous output indicating a probability that the machine (100) has reached a steady state of crop processing,
and wherein the operating state evaluation circuit (228) is configured to receive the continuous output of each parameter range classifier circuit (224, 226) and is configured to generate the operating state signal value (232) based upon the continuous output of each parameter range classifier circuit (224, 226).

18. The harvesting machine (100) according to claim 17, further comprising a controller circuit (220), wherein the operating state signal value (232) is configured to be communicated to the controller circuit (220) for at least one of (i) automatic control of an actuator (202, 204, 206, 208, 210, 212) for adjusting a crop processing parameter of the harvesting machine (100), and (ii) automatic control of an operator interface device (154) to indicate an adjustment value for the actuator (202, 204, 206, 208, 210, 212) to a machine operator, and further wherein the controller circuit (220) is configured to (i) receive the signal indicating the crop parameter, (ii) receive the signal indicating the processing result parameter and (iii) evaluate the adjustment value based upon the signal indicating the crop parameter and the signal indicating the processing result parameter after the operating state signal value (232) indicates that the harvesting machine (100) has reached a steady state of crop processing.

19. The harvesting machine of claim 15, wherein the weighting function evaluator is configured to generate a reliability signal indicating a reliability for each of the first signals and wherein the operating state evaluation circuit generates the operating state signal based upon the reliability signal for each of the first signals from the at least two sensors.

20. The harvesting machine of claim 15, wherein the at least two sensors comprise:
a first sensor selected from a first group of sensors consisting of: a mass flow sensor, a moisture sensor, a relative humidity sensor, a temperature sensor and a material moisture sensor; and
a second sensor selected from a second group of sensors consisting of: a grain loss sensor, a green damage sensor, a tank cleanliness sensor and a tailings volume sensor.

* * * * *